United States Patent [19]

Gardikes

[11] 4,268,425
[45] May 19, 1981

[54] PHENOLIC RESIN-POLYISOCYANATE BINDER SYSTEMS CONTAINING A DRYING OIL AND USE THEREOF

[75] Inventor: John J. Gardikes, Worthington, Ohio

[73] Assignee: Ashland Oil, Inc., Ashland, Ky.

[21] Appl. No.: 39,016

[22] Filed: May 14, 1979

[51] Int. Cl.³ .................. B22C 1/22; B22C 9/02; B28B 7/34; C08L 91/00
[52] U.S. Cl. .................. 260/19 A; 106/38.7; 164/16; 164/43
[58] Field of Search ............ 164/16, 43; 260/19 A; 106/38.7

[56] References Cited

U.S. PATENT DOCUMENTS

| | | | |
|---|---|---|---|
| 2,383,283 | 8/1945 | Auxier et al. | 260/19 A |
| 3,255,500 | 6/1966 | Engel et al. | 260/22 TN |
| 3,403,721 | 10/1968 | Robins et al. | 164/43 |
| 3,409,579 | 11/1968 | Robins | 260/30.4 R |
| 3,426,834 | 2/1969 | Jacobs et al. | 164/43 |
| 3,428,110 | 2/1969 | Walker et al. | 164/43 |
| 3,485,797 | 12/1969 | Robins | 260/38 |
| 3,632,844 | 1/1972 | Robins | 260/18 TN |
| 3,676,392 | 7/1972 | Robins | 525/504 |
| 3,686,106 | 8/1972 | Tideswell et al. | 260/19 A |
| 3,905,934 | 9/1975 | Gardikes | 260/38 |
| 4,157,993 | 6/1979 | Funabiki et al. | 260/19 A |

FOREIGN PATENT DOCUMENTS

WO79/00354 6/1979 PCT Int'l Appl. .................. 164/43

Primary Examiner—Ronald W. Griffin
Attorney, Agent, or Firm—Pollock, Vande Sande & Priddy

[57] ABSTRACT

A binder containing a phenolic resin; a polyisocyanate; a curing component, and a drying oil; and use thereof.

27 Claims, No Drawings

PHENOLIC RESIN-POLYISOCYANATE BINDER SYSTEMS CONTAINING A DRYING OIL AND USE THEREOF

DESCRIPTION

Technical Field

The present invention relates to binder compositions, methods for curing such binder compositions, and use thereof. The binder compositions of the present invention are especially useful as molding compositions such as refractories, abrasive articles, and molding shapes such as cores and molds. The preferred binder compositions of the present invention are especially useful in obtaining foundry shapes which exhibit improved shake-out properties when used in the casting of relatively low melting point metals such as aluminum. The binder compositions are capable of being cured at room temperature, by a gaseous curing agent or an alkaline agent incorporated into the binder.

Background Art

U.S. Pat. Nos. 3,409,579 and 3,676,392 disclose binder compositions made available as two-package systems comprising a resin component in one package and a hardener component in the other package. The resin component comprises an organic solvent solution of phenolic resin. The hardener component comprises a liquid polyisocyanate having at least two isocyanate groups per molecule. At the same time the contents of the two packages are combined and then mixed with the sand aggregate or preferably the packages are sequentially admixed with sand aggregate. After a uniform distribution of the binder on the sand particles has been obtained, the resulting foundry mix is molded into the desired shape. In U.S. Pat. No. 3,409,579 the molded shape is cured by passing a gaseous tertiary amine through it. In U.S. Pat. No. 3,676,392, curing is effected by means of a base having a $pK_b$ value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener, or it may be introduced as the third component of a three-package binder system comprising in separate packages the resin component, the hardener, and the base.

In both U.S. Pat. Nos. 3,409,579 and 3,676,392 the preferred phenolic resins are benzylic ether resins. These are the condensation products of a phenol having the general formula:

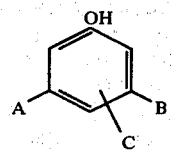

wherein A,B, and C are hydrogen, hydrocarbon radicals, oxyhydrocarbon radicals, or halogen with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. No. 3,485,797.

In the preferred form, these resins have the general formula:

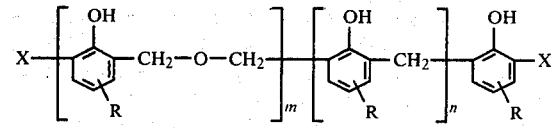

wherein R is a hydrogen or a phenolic substituent as described in U.S. Pat. Nos. 3,409,579; 3,676,392; and 3,485,797, meta to the phenolic hydroxyl group, the sum of m and n is at least 2 and the ratio of m-to-n is at least 1, and X is an end-group from the group consisting of hydrogen and methylol, the molar ratio of said methylol-to-hydrogen end-groups being at least 1.

The phenolic resin component of the binder composition is, as indicated above, generally employed as a solution in an organic solvent.

The second component or package of the novel binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethyl diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

Although the solvent employed in combination with either the phenolic resin or the polyisocyanate or for both components does not enter to any significant degree into the reaction between the isocyanate and the phenolic resin in the presence of the curing agent, it can affect the reaction. Thus the difference in the polarity between the polyisocyanate and the phenolic resin restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents.

Aromatic solvents stated in U.S. Pat. No. 3,409,579 to be suitable are benzene, toluene, xylene, ethylbenzene, and mixed solvents having an aromatic content of at least 90% and a boiling point range of 280° to 450° F. Suitable polar solvents are stated to be furfural, furfuryl alcohol, Cellosolve acetate, butyl Cellosolve, butyl Carbitol, diacetone alcohol and "Texanol." Isophorone ($C_9H_{14}O$) and other cyclic ketones more recently have proved to be excellent polar solvents for the resin. Kerosene and other aliphatic solvents have also been used as components of the solvent system. Minor portions of releasing agents and adhesion promoters, (silane compounds) added to the solvent system have also proved useful.

U.S. Pat. No. 3,905,934 discloses the use of alkyl esters of phthalic acid as solvent for the resin component of binders of the type disclosed in said U.S. Pat. Nos. 3,409,579 and 3,676,392. The alkyl esters of phthalic acid are disclosed as providing improvements in the "out-of-the-box" strength, the ultimate tensile strength, and the resistance to humidity of sand cores made with the above-described benzylic ether resin-polyisocyanate composition using o-phthalate alkyl esters rather than isophorone as a solvent for the resin composition.

U.S. Pat. No. 3,632,844 discloses the addition of fatty acids to foundry mixes containing foundry aggregate, a phenolic resin, and an organic polyisocyanate such as the type disclosed in U.S. Pat. Nos. 3,409,579 and 3,432,457. The fatty acids are added to reduce the tendency of the cured shaped mix to stick to the mold. This patent further states that derivatives of the fatty acids such as esters, amides, amines and alcohols are not useful (see column 3, lines 21-23).

U.S. Pat. No. 3,255,500 discloses foundry products wherein the binder comprises a drying oil and about 10-15% by weight of polyisocyanate based upon the weight of the drying oil.

DESCRIPTION OF INVENTION

The present invention in the use of drying oils provides for improved bench life of the molding compositions along with acceptable immediate and ultimate strength characteristics. In addition, as will be discussed hereinbelow, certain preferred compositions unexpectedly exhibit improved shake-out properties when casting relatively low melting point metals such as aluminum.

In the past, the relatively low melting point of nonferrous type metals has not been high enough to degrade the bonding characteristics of the binder systems of the type disclosed in U.S. Pat. Nos. 3,409,579 and 3,676,392, discussed hereinabove, sufficiently to provide the degree of collapsibility necessary for shake-out by simple mechanical forces available in a commercial application. However, certain preferred binder systems of the present invention make it possible to provide molding shapes which can be collapsed and shaken out from castings of the relatively low melting point nonferrous type metals and particularly aluminum, magnesium, copper and copper alloys such as brass. Such preferred binder systems have poor erosion resistance in gray iron application. However, other less preferred compositions of the present invention are suitable for obtaining molding shapes which possess good collapsibility and shake-out of the shape when used for the casting of the relatively high melting point ferrous-type metals such as iron and steel which are poured at about 2500° F.

In addition, those binder systems having poor erosion can still be used for casting gray iron and the like when a core wash or coating is employed. For instance, core washes such as Velva Dri CGS from Ashland Oil, Inc. slurry which contain a highly refractory insulating ceramic combined with graphite can be employed for such purpose as well as other ceramic based washes, graphite based washes, and zircon based washes.

The present invention is concerned with a binder composition which comprises a resin component, a hardener component, a curing component and a drying oil. The resin component includes a non-aqueous phenolic resin which comprises a condensation product of a phenol with an aldehyde. The phenol has the formula

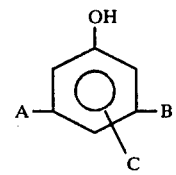

wherein A, B and C are hydrogen, or hydrocarbon radicals or halogen. The aldehyde has the formula R'CHO wherein R' is a hydrogen or hydrocarbon radical of 1 to 8 carbon atoms. The hardener component comprises liquid polyisocyanate containing at least two isocyanate groups.

The present invention is also concerned with molding compositions which comprise a major amount of aggregate; and an effective bonding amount up to about 40% by weight of the aggregate of the binder composition described hereinabove.

Moreover, the present invention is concerned with fabricating foundry shapes which comprises mixing foundry aggregate with a bonding amount of up to about 10% by weight based upon the weight of the aggregate of the binder composition described hereinabove. The foundry mix is introduced in a pattern and hardened to become self-supporting. The shaped foundry mix is removed from the pattern and allowed to further cure to thereby obtain a hard, solid, cured foundry shape.

Furthermore, the present invention is concerned with a process for casting a metal. The process comprises fabricating a foundry shape as discussed hereinabove and pouring the metal while in the liquid or molten state into or around the shape. The metal is allowed to cool and solidify and is then separated from the molded article.

BEST MODES FOR CARRYING OUT INVENTION

The drying oils which are useful in the present invention are glycerides of fatty acids which contain two or more double bonds whereby oxygen on exposure to air can be absorbed to give peroxides which catalyze the polymerization of the unsaturated portions. Examples of some natural drying oils include soybean oil, sunflower oil, hemp oil, linseed oil, tung oil, oiticica oil and fish oils, and dehydrated castor oil, as well as the various known modifications thereof (e.g., the heat bodied, air-blown, or oxygen-blown oils such as blown linseed oil and blown soybean oil). The above discussion concerning the oils is not intended to imply that such actually cure in the present system by air drying but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil employed in the present invention is linseed oil.

The amount of the drying oil employed is generally at least about 2%, preferably about 2% to about 15%, and most preferably about 4% to about 10% by weight based upon the total of the components in the binder composition.

The binder compositions which can be benefited by use of this invention are known to the art and are those which contain a phenolic resin and a polyisocyanate, as well as certain phenolic resin and polyisocyanate combinations which, as will be discussed hereinbelow, are preferred and are deemed to be novel.

Such phenolic/isocyanate binder systems are co-reacted at or about the time of use in the presence of sand. Typically, the reactive ingredients of such binder compositions are sold, shipped and stored in separate packages (i.e., a multiple package core binder) to avoid undesirable deterioration due to premature reaction between the components. Solvents, catalysts, various additives and other known binders can optionally be used in conjunction with these essential ingredients, i.e., used with the phenolic resin and the isocyanate.

Any phenolic resin which is substantially free of water and is soluble in an organic solvent can be employed. The term "phenolic resin" as employed herein is meant to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 9 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

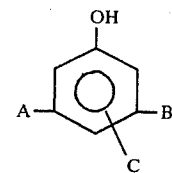

wherein A, B, and C are hydrogen, hydrocarbon radicals, oxyhydrocarbon radicals, or halogen.

The preferred phenol component employed is a mixture of phenol with mono-and/or dialkyl ortho-substituted phenols such as 2,6 xylenol and ortho-cresol with ortho-cresol being the preferred. The mole ratio of phenol to said ortho-substituted phenols is generally about 0.2:0.8 to about 0.8:0.2, and preferably about 0.3:0.7 to about 0.7:0.3.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde. Generally, novolaks are obtained from mixtures of phenols and aldehydes having mole ratios of phenols to aldehydes of about 1:0.5 to 1:0.85.

The phenolic resins employed in the binder compositions can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve uniform distribution of the binder on the aggregate. The substantial absence of water in the phenolic resin is desirable in view of the reactivity of the binder composition of the present invention with water. The term "non-aqueous" or substantially water-free as employed herein is meant to define a phenolic resin which contains less than 5 percent of water and preferably less than 1 percent of water based on the weight of the resin. Mixtures of phenolic resins can be used.

Although both the resole resins and the novolak resins can be employed in the binder compositions of the present invention, and when admixed with polyisocyanates and a foundry aggregate and cured by use of catalysts form cores of sufficient strength and other properties to be suitable in industrial applications, the novolac resins are preferred over the resole resins. The preparation of novolak resins is known in the art and for that reason not specifically referred to herein.

The phenolic resin component of the binder composition is, as indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of up to 80 percent by weight of the resin solution and preferably in the range of 20 to 80 percent. It is preferred to keep the viscosity of the first component at less than X-1 on the Gardner-Holt Scale.

The use of the preferred phenolic resins (i.e.—novolac type employing the ortho-substituted phenols) unexpectedly exhibit improved shake-out properties when used in the casting of relatively low melting point metals (e.g.—melting point of about 2000° F. and below) such as aluminum, copper and copper alloys such as brass, while at the same time exhibit good tensile properties and bench life characteristics.

The second component or package of the binder composition comprises an aliphatic, cycloaliphatic, or aromatic polyisocyanate having preferably from 2 to 5 isocyanate groups. If desired, mixtures of organic polyisocyanates can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4'- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof. Mixtures of isocyanates can be used.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution. Most preferably the isocyanate is employed in a stoichiometric amount ± about 20% based on the available hydroxyl groups of the phenolic resin.

The difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene and mixtures thereof. Preferred aromatic solvents are mixed solvents that have an aromatic content of at least 90 percent and a boiling point range of 280° to 450° F. The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

The drying oil discussed hereinabove can be considered as part of the solvent component of the composition.

In addition, the solvent component can include liquid dialkyl ester such as dialkyl phthalate of the type disclosed in U.S. Pat. No. 3,905,934. Such preferably have the structure:

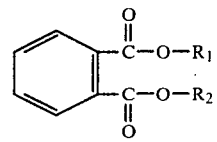

where $R_1$ and $R_2$ are alkyl radicals of 1 to 12 carbon atoms and the total number of carbon atoms in the R groups does not exceed 16. Preferably $R_1$ and $R_2$ are alkyl radicals of 3 to 6 carbon atoms and the total number of carbon atoms in $R_1$ and $R_2$ is between 6 and 12. Thus in the above structural formula, either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from Du Pont under the trade designation DBE-5; dimethyl adipate available from Du Pont under the trade designation DBE-6, dimethyl succinate; and mixtures of such esters which are available from Du Pont under the trade designation DBE, and dialkyl adipates and succinates with alcohols up to 12 carbon atoms.

The binder compositions are preferably to be made available as a two-package system with the phenolic resin in one package and the isocyanate component in the other package with the drying oil. Usually, the binder components are combined and then admixed with sand or a similar aggregate to form the molding mix or the mix can also be formed by sequentially admixing the components with the aggregate. Methods of distributing the binder on the aggregate particles are wellknown to those skilled in the art. The mix can, optionally, contain other ingredients such as iron oxide, ground flax fibers, wood cereals, pitch, refractory flours, and the like.

When preparing an ordinary sand type foundry shape, the aggregate employed has a particle size large enough to provide sufficient porosity in the foundry shape to permit escape of volatiles from the shape during the casting operation. The term "ordinary sand type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no smaller than about 50 and about 150 mesh (Tyler Screen Mesh). The aggregate for foundry shapes preferably has an average particle size between about 50 and about 150 mesh (Tyler Screen Mesh). The preferred aggregate employed for ordinary foundry shapes is silica wherein at least about 70 weight percent and preferably at least about 85 weight percent of the sand is silica. Other suitable aggregate materials include zircon, olivine, alumino-silicate sand, chromite sand and the like.

When preparing a shape for precision casting, the predominate portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and alumino-silicate sands.

Shapes for precision casting differ from ordinary sand type foundry shapes in that the aggregate in shapes for precision casting can be more densely packed than the aggregate in shapes for ordinary sand type foundry shapes. Therefore, shapes for precision casting must be heated before being utilized to drive off volatilizable material present in the molding composition. If the volatiles are not removed from a precision casting shape before use, vapor created during casting will diffuse into the molten melt since the shape has a relatively low porosity. The vapor diffusion would decrease the smoothness of the surface of the precision cast article.

When preparing a refractory such as a ceramic, the predominant portion and at least 80 weight percent of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1500° F. which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregates can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 200 mesh. It is most preferred that at least about 95% of the inorganic filler has an average particle size no greater than 200 mesh. Some inorganic fillers include cryolite, fluorospar, silica and the like. When an inorganic filler is employed along with the abrasive grit, it is generally present in amounts from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5 to about 7% by weight based upon the weight of the aggregate. Most often, the binder content ranges from about 0.6 to about 5% by weight based upon the weight of the aggregate in ordinary sand type foundry shapes. For casting of low melting point metals where shake-out and collapsibility are important, about 0.6 to about 1.5% by weight based upon the weight of the aggregate in ordinary sand type foundry shapes is preferably used.

In molds and cores for precision casting applications the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed, since such excess polyisocyanate will react with the water.

The molding mix is molded into the desired shape, whereupon it can be cured. Curing is effected either by passing a tertiary amine through the molded mix as described in U.S. Pat. No. 3,409,579 or by the action of a base catalyst previously incorporated into the mix as set forth in U.S. Pat. No. 3,676,392.

A valuable additive to the binder compositions of the present invention in certain types of sand is a silane having the general formula:

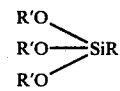

wherein R' is a hydrocarbon radical and preferably an alkyl radical of 1 to 6 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.1 to 2% based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma animopropyltriethoxy silane); Union Carbide A-1120 (N-beta (aminoethyl)-gamma-aminopropyltrimethoxy silane); and Union Carbide A-1160 (Ureido-silane).

With respect to the sands employed in the Examples hereinbelow, it has been noted that Wedron 5010 silica sand provides better strengths and the more preferred binder levels can be dropped down to about 0.7% since such is a "pure" round grain silica sand. Port Crescent Sand and Manley 1L Sand are lake sands which are classified as angular sands. Although the sands are washed and dried, they contain clay impurities. More binder is required with lake sands as compared to Wedron on equivalent strengths. The aluminum shake-out is much better with these lake sands compared to Wedron, but the surface finish of aluminum casting is not as good.

In addition, it has been noted that the phenolic portion and the isocyanate portion of the compositions have viscosities up to about 1000 centipoise and preferably about 550 or less to facilitate contact with the aggregate. Also, the binder composition preferably contains a total of about 35 to about 50% by weight of total solvent which includes the drying oil. Also, it is important that the phenol portion and isocyanate portion be compatible with each other.

In order to further understand the present invention, the following non-limiting examples concerned with foundry are provided. All parts are by weight unless the contrary is stated. In all examples, the foundry samples are cured by the so-called "cold-box" process by contacting with dimethylethylamine.

EXAMPLE A

The following is a typical procedure which can be employed to prepare novolak polymers used in the present invention.

Charge the phenolic component such as phenol and o-cresol and the formaldehyde such as an aqueous formaldehyde (50%) to a reaction vessel provided with stirrer, thermometer and condenser.

Stir for a few minutes and add an acid catalyst such as oxalic acid. Continue stirring, and after a few minutes sample for pH. The pH should preferably be 0.9–1.1.

Heat to reflux temperatures (e.g.—about 100°–102° C.) and hold at this temperature until substantially all of the formaldehyde has reacted (0–0.5% free formaldehyde). Start atmospheric dehydration and heat to about 165° C.

At this point vacuum may be applied to remove unreacted phenols of the resin can be used as such. A typical procedure to remove most unreacted phenols is to apply vacuum until temperature drops, e.g. to 145° C. Then apply heat (still under vacuum) to raise the temperature back to 160° C. The resin is then mixed with solvents and ready for use.

EXAMPLE B

The following is a typical procedure which can be employed to prepare resole type polymers suitable for use in the present invention.

Charge the phenolic component such as phenol and o-cresol, the formaldehyde component such as 91% paraformaldehyde and ortho-directing metal catalyst such as zinc acetate to a reaction vessel of the type described in Example A.

Heat to and hold at about 115° C. under reflux conditions. Temperature drops as water is formed.

Continue refluxing, regardless of reaction temperature, until all of the formaldehyde has reacted or the free formaldehyde is less than about 5%.

Heat under atmospheric dehydration conditions to about 125° C. until substantially all of the free formaldehyde has reacted.

The resin may be diluted at this point with solvents or vacuum may be applied to remove the last traces of water and then mixed with solvents.

EXAMPLE I

About 3000 parts of Port Crescent Sand are admixed with about 16.1 parts of phenolic resin composition of about 50% by weight of a novolak phenolic resin from o-cresol, phenol and formaldehyde in a mole ratio of 0.5:0.5:0.675; about 33% by weight of DBE-2; about 15% by weight of a $C_6$–$C_{10}$ dialkyl adipate; about 2% of TXIB (2,2,4-trimethyl-1,3-pentanediol diisobutyrate; and about 0.2% of Dow Corning Z6040 (gamma-glycidoxy propyl trimethoxysilane) for about 2 minutes. To this mixture are admixed about 13.9 parts of an isocyanate composition of about 75% by weight of Mondur MR (mixture of diphenylmethane diisocyanate and triphenylmethane triisocyanate); about 10% by weight of linseed oil; about 8.8% of Texaco 7545 (an aromatic solvent having an initial boiling point (I.B.P.) of about 440° F., 10% at about 490° F.; 50% at about 510; 90% at about 600; and dry end point 700° F.); and about 6.2% of kerosene for about 2 minutes.

The resulting foundry mix is forced by air blowing into standard AFS tensile strength samples (dog bones) using the standard procedure.

The resulting test samples are then cured by gasing with dimethylethylamine for 1 second and purged with air for about 4 seconds. The cured samples are tested for tensile strength and aluminum shake-out.

The "dog bone" cores where used in shake-out studies with aluminum castings. Seven tensile briquettes (dog bones) were arranged in a mold. The mold incorporated a gating system. The mold is designed to provide hollow castings having a metal thickness of approximately one-quarter inch on all sides. An opening at an end of the casting is provided for removal of the core from the casting. Molten aluminum at approximately 1300° F. prepared from aluminum ingots was poured into the mold. After cooling for about an hour the aluminum castings are broken from the gating system and removed from the mold for shake-out testing.

Shake-out tests are performed by placing a casting in a one gallon container. The container is placed on an agitating roller and tumbled for 5 minutes. The weight of the sand cored which is removed from the casting in this manner is compared to the initial weight of sand core and a percent shake-out is calculated. Sand remaining in the casting after the agitation described above is removed by scraping and also weighed. It should be noted that the shake-out test above described is not a standard test. Applicant is not aware of any standard test to measure this quality. It is submitted that the test used is valid for gaining an understanding of the collapsibility of a binder and for comparing the relative collapsibility of binders. The percents given are subject to a degree of variance but are reliable indicators.

The average immediate tensile strength is about 78 psi, after about 1 hr. is about 103 psi, after about 3 hrs. is about 105 psi, and after 6 days and at the time of pouring is about 140 psi. There is 100% shake-out from aluminum.

EXAMPLE II

Example I is repeated except that the foundry mix contains about 20.2 parts of the phenolic resin composition and about 17.3 parts of isocyanate composition. The average immediate tensile strength is about 110 psi, after 1 hr. about 143 psi, after about 3 hrs. about 157, and after 6 days and at the time of pouring is about 205 psi. The aluminum shake-out is about 39%.

EXAMPLE III

Example I is repeated except that the foundry mix contains about 24.2 parts of the phenolic resin composition and about 20.8 parts of the isocyanate composition. The average immediate tensile strength is about 120 psi, after 1 hr. about 207 psi, after about 3 hrs. about 212 psi, and after six days and at the time of pouring is about 268 psi. The aluminum shake-out is about 24%.

EXAMPLE IV

Example I is repeated except that the foundry mix contains about 7000 parts by weight of Manley IL Sand; about 52.5 parts by weight of the phenolic resin composition, and about 52.5 parts by weight of the isocyanate composition which is modified by adding about 0.5% by weight of phthaloyl chloride. The average immediate tensile strength is about about 160, after 1 hr. about 253, and overnight about 240. The aluminum shake-out is 100%. The composition is also tested for bench life with the following results: after 1½ hrs. an immediate average tensile strength of about 140 and overnight about 222 psi; at about 3 hrs. an immediate average of about 122 psi and an overnight average of about 200 psi; after about 4½ hrs. an immediate average of about 108 psi and an average overnight of about 168 psi; at 5½ hrs. an immediate average of about 103 psi and an average overnight of about 158 psi; at about 6½ hrs. an immediate average of about 90 psi and an overnight average of about 153 psi.

EXAMPLE V

Example I is repeated except that the foundry mix contains about 3000 parts by weight of Wedron 5010 Sand; about 22.5 parts by weight of a phenolic resin composition; and about 22.5 parts by weight of the isocyanate composition. The phenolic resin composition contains about 50% by weight of a phenolic resin from ortho-cresol, phenol, and formaldehyde in a mole ratio of about 0.5:0.5:0.675; about 34% by weight of DBE-2; about 11% by weight of Texaco 7545; and about 5% by weight of TXIB. The isocyanate composition is the same as used in Example I except that about 10% by weight of tung oil is used in place of the linseed oil. The average immediate tensile strength is about 160 psi; after one hour at 40% humidity is about 223 psi; after 1 hr. at 80% humidity is about 188; overnight at about 40% humidity is about 183 psi; and overnight at about 80% humidity is about 62 psi.

EXAMPLE VI

Example V is repeated except that the isocyanate composition contains about 5% by weight of the tung oil and about 13.8% by weight of the Texaco 7545. The average immediate tensile strength is about 152 psi; after 1 hr. at about 40% humidity is about 192 psi; after 1 hr. at about 80% relative humidity is about 185 psi; overnight at about 40% relative humidity is about 180 psi; overnight at about 80% humidity is about 68 psi.

EXAMPLE VII

Example VI is repeated except that the phenolic resin composition also contains about 0.2% by weight of Dow Corning Z6040. The average immediate tensile strength is about 130 psi; after about 1 hr. at 40% humidity is about 190 psi; after about 1 hr. at 80% humidity is about 180 psi; overnight at about 40% relative humidity is about 208 psi; overnight at 80% relative humidity is about 197 psi.

A comparison of Example VIII with Example VII illustrates the improved humidity resistance obtained by employing a silane.

EXAMPLE VIII

Example VII is repeated except that the isocyanate part of the composition contains about 5% by weight of vegetable oil; and about 13.85% by weight of the Texaco 7545. The immediate average tensile strength is about 123 psi; after 1 hr. at about 60% relative humidity is about 112 psi; after 1 hr. at about 80% relative humidity is about 90 psi; overnight at about 40% relative humidity is about 190 psi; and overnight at about 80% relative humidity is about 175 psi.

EXAMPLE IX

Example VIII is repeated except that the isocyanate portion of the composition contains about 8.8% by weight of Texaco 7545 and about 10% by weight of soybean oil. The average immediate tensile strength is about 127 psi; after 1 hr. at about 60% relative humidity is about 160 psi; after 1 hr. at about 80% relative humidity is about 130 psi; overnight at a relative humidity of about 40% about 250 psi; and overnight at about 80% relative humidity is about 215 psi.

EXAMPLE X

The previous example is repeated except that the isocyanate portion of the composition contains about 5% by weight of soybean oil and about 13.8% by weight of the Texaco 7545. The average immediate tensile strength is about 148 psi; after 1 hr. at about 60% relative humidity is about 155 psi; after 1 hr. at about 80% relative humidity is about 140 psi; overnight at about 40% relative humidity is about 220 psi; overnight at about 80% relative humidity is about 193 psi.

EXAMPLE XI

Example I is repeated except that the foundry mix contains about 4000 grams of Wedron 5010 as the sand and the isocyanate portion of the composition contains about 17.5% by weight of linseed oil and about 1.3% by weight of the Texaco 7545. The average immediate tensile strength is about 200 psi; at 1 hr. is about 265 psi; overnight at 40% relative humidity is about 303 psi; overnight at about 78% relative humidity is about 145 psi; overnight at about 92% relative humidity is about 125 psi; and overnight at 100% relative humidity is about 57 psi. The one hour test specimens when baked at 300° F. for about 15 minutes exhibited upon cooling strength of about 410 psi.

EXAMPLE XII

Example I is repeated except that the foundry mix contains about 3000 parts by weight of Wedron 5010 as the sand, and the isocyanate portion of the composition contains about 75% by weight of Isonate 143L (diphenylmethane diisocyanate), about 5% by weight of the linseed oil, about 13.8% by weight of the Texaco 7545; and about 6.2% by weight of kerosene. The average immediate tensile strength is about 113 psi; at 1 hr. is about 168 psi; at 2 hrs. is about 175 psi; and at 4 hours and time of pouring is about 170 psi. The percent aluminum shake-out is about 33%. The foundry composition in this example employed about 15.5 parts by weight of the phenolic resin composition and about 14.5 parts by weight of the isocyanate composition.

EXAMPLE XIII

Example XII is repeated except that the foundry mix contains about 12.4 parts by weight of the phenolic resin composition and about 11.6 parts by weight of the isocyanate composition, and that the isocyanate composition contains about 10% of the linseed oil and about 8.8% of aromatic solvent HiSol-10 in place of the Texaco 7545. The immediate average tensile strength is about 90 psi, at 1 hr. about 145 psi, at 2 hrs. about 145 psi, after 4 days and at the time of pouring about 150 psi. The percent aluminum shake-out is about 93%.

EXAMPLE XIV

Example I is repeated except that the foundry mix contains about 3000 parts by weight of Wedron 5010 as the sand, about 12.9 parts by weight of the phenolic resin composition, and 11.1 parts by weight of an isocyanate composition. The isocyanate composition employed contains about 75% by weight of Mondur MR, about 5% by weight of linseed oil, about 13.8% by weight of HiSol-10 and about 6.2% by weight of kerosene. The immediate average tensile strengths is about 105 psi, at 1 hr. about 133 psi, and at 4 days and time of pouring about 148 psi. The percent of aluminum shake-out is about 32%.

EXAMPLE XV

Example XIV is repeated except that the isocyanate portion of the composition contains about 75% by weight of PAPI 901 (polymethylene polyphenyl isocyanate) as the isocyanate. The average immediate tensile strength is about 85 psi, at 1 hr. is about 122 psi, at 4 days and time of pouring is about 140 psi. The percent aluminum shake-out is about 26%.

It is noted that repeating the above two examples but by increasing the binder content to 1% based on the sand resulted in 0% aluminum shake-out. However, the sand from these latter two examples could be readily removed from the casting with a minimum amount of mechanical force such as ramming.

EXAMPLE XVI

Example I is repeated except that the foundry mix contains about 2000 parts by weight of Wedron 5010 as the sand; about 15 parts by weight of a phenolic resin composition; and about 15 parts by weight of the isocyanate composition. The phenolic resin composition contains about 45% by weight of a phenolic resin from phenol and formaldehyde in a mole ratio of about 1:0.685; about 40% by weight of DBE-2; about 10% by weight of TXIB; and about 5% by weight of furfuryl alcohol. The initial tensile strength is less than 5 psi and after 24 hrs. is about 140 psi.

EXAMPLE XVII

Example I is repeated except that the foundry composition contains about 3000 parts by weight of Wedron 5010 as the sand; about 16.1 parts by weight of the phenolic resin composition; and about 13.9 parts by weight of the isocyanate composition. The phenolic resin composition contains about 50% by weight of a phenolic novolak resin of 2,6 xylenol, phenol, and formaldehyde in a mole ratio of about 0.35:0.65:0.75; about 33% by weight of DBE-2; about 12% by weight of a $C_6$–$C_{10}$ dialkyl adipate; about 5% by weight of butyl Cellosolve acetate; and about 0.2% by weight of Dow Corning Z6040. The average immediate tensile strength is about 90 psi; at 1 hr. is about 162 psi; and the aluminum shake-out is about 35%.

EXAMPLE XVIII

Example I is repeated except that the foundry mix contains about 3000 parts by weight of Wedron 5010 as the sand; about 23.7 parts by weight of a phenolic resin composition; and about 21.3 parts by weight of the isocyanate composition. The phenolic resin composition contains about 45% by weight of a novolak phenolic resin of a nonyl phenol; phenol, and formaldehyde in a mole ratio of about 0.2:0.8:0.7; about 40% by weight of DBE-2; about 10% by weight of Texaco 7545; and about 5% by weight of TXIB; and about 0.2% by weight of Dow Corning Z6040. The average initial tensile strength is about 38 psi; at 1 hr. about 78 psi; at 24 hrs. about 137 psi.

I claim:

1. A binder composition comprising in admixture a resin component, a hardener component, a curing component and a drying oil; said resin component including a non-aqueous phenolic resin which comprises a condensation product of a phenol having the general formula:

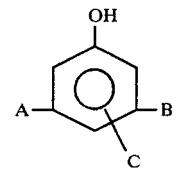

wherein A, B and C are hydrogen, hydrocarbon radicals, or halogen, with an aldehyde having the general formula R'CHO wherein R' is a hydrogen or a hydrocarbon radical of 1 to 8 carbon atoms; said hardener component comprising liquid polyisocyanate containing at least two isocyanate groups, and said drying oil is selected from the group of ester of ethylenically unsaturated fatty acid, heat bodied modification thereof, air-blown modification thereof, oxygen-blown modification thereof, or mixtures thereof.

2. The binder composition of claim 1 wherein said oil is linseed oil.

3. The binder composition of claim 1 wherein said oil is a vegetable oil.

4. The composition of claim 1 wherein said oil is soybean oil.

5. The composition of claim 1 wherein said oil is tung oil.

6. The binder system of claim 1 wherein said phenolic resin is a novolak resin.

7. The binder composition of claim 1 wherein said phenolic resin is from a phenol which comprises an alkyl ortho-substituted phenolic compound.

8. The composition of claim 1 wherein said phenolic resin is from a phenol which comprises a mono alkyl ortho-substituted phenol.

9. The binder system of claim 1 wherein said phenolic resin is a novolak resin from o-cresol, phenol, and formaldehyde.

10. The binder composition of claim 1 which includes a silane.

11. The composition of claim 1 wherein the amount of oil is at least about 2% by weight of the binder composition.

12. The composition of claim 1 wherein said oil is present in an amount of up to about 15% by weight of the binder composition.

13. The composition of claim 1 wherein said oil is present in an amount of about 2 to about 15% by weight of the binder composition.

14. The binder composition of claim 1 wherein said oil is present in an amount of about 4 to about 10% by weight of the binder composition.

15. The composition of claim 1 wherein said phenolic resin is from a phenolic component which includes ortho-cresol and phenol in mole ratios of about 0.2:0.8 to 0.8:0.2.

16. The binder composition of claim 1 wherein said phenolic resin is from phenol, ortho-cresol, and formaldehyde in a mole ratio of about 0.5:0.5:0.675.

17. The composition of claim 9 or 15 or 16 wherein the amount of oil is at least about 2% by weight of the binder composition.

18. The composition of claim 9 or 15 or 16 wherein said oil is present in an amount of about 2 to about 15% by weight of the binder composition.

19. The binder composition of claim 9 or 15 or 16 wherein said oil is present in an amount of about 4 to about 10% by weight of the binder composition.

20. The composition of claim 1 wherein said ester is a glyceride of fatty acid which contains at least two double bonds.

21. A molding composition which comprises:
A. a major amount of aggregate; and
B. an effective bonding amount up to about 40% by weight of the aggregate of the binder composition of claims 1, 2, 3, 4, 5, 6, 9, 13, 14, 15, 16, or 20.

22. The composition of claim 21 wherein the amount of said binder composition is about 0.6–about 5% based upon the weight of aggregate.

23. A process for the fabrication of foundry shape which comprises:
A. mixing foundry aggregate with a bonding amount of up to about 10% by weight based upon the weight of the aggregate of the binder composition of claims 1, 2, 3, 4, 5, 6, 9, 13, 14, 15, 16 or 20.
B. introducing the foundry mix obtained from step (A) into a pattern;
C. hardening the foundry mix in the pattern to become self-supporting; and
D. thereafter removing the shaped foundry mix of step (C) from the pattern and allowing it to further cure, thereby obtaining a hard, solid, cured foundry shape.

24. The process of claim 23 wherein the amount of said binder composition is about 0.6–about 5% based upon the weight of aggregate.

25. A process of casting a metal which comprises:
A. fabricating a shape in accordance with claim 23;
B. pouring said metal while in the liquid state into or around said shape;
C. allowing said metal to cool and solidify; and
D. then separating the molded article.

26. The process of claim 25 wherein said metal is a relatively low melting point non-ferrous metal melting at about 2000° F. or below, and the amount of said binder is about 0.6–about 1.5% by weight based upon the weight of aggregate.

27. The process of claim 26 wherein said metal is aluminum.

* * * * *